H. WILLARD.
STOVE FOR BURNING STUMPS.
No. 3,968. Reissued May 10, 1870.
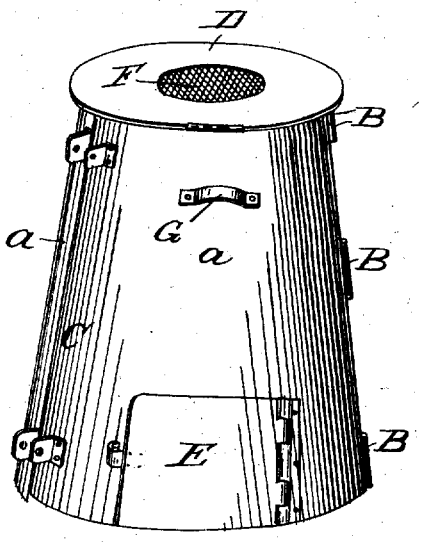
Witnesses:
O. H. Simonds
C. C. Bicknell
Inventor:
Henderson Willard
THE NORRIS PETERS CO., PHOTO-LITHO., WASHINGTON, D. C.

United States Patent Office.

HENDERSON WILLARD, OF GRAND RAPIDS, MICHIGAN.

*Letters Patent No.* 99,801, *dated February* 15, 1870; *antedated January* 29, 1870; *reissue No.* 3,968, *dated May* 10, 1870.

STOVE FOR BURNING STUMPS.

The Schedule referred to in these Letters Patent and making part of the same.

*To all whom it may concern:*

Be it known that I, HENDERSON WILLARD, of the city of Grand Rapids, in the county of Kent and State of Michigan, have invented a new and useful Process of Ridding Land of Stumps; and I do declare that the following is a full and sufficient description thereof, reference being had to the accompanying drawings and the letters of reference marked thereon.

This invention consists in placing over and around a stump to be destroyed, a cylinder or stove of suitable cast or sheet metal, constructed in the simplest and cheapest manner, for the purpose of burning the stump therein, as hereinafter more fully set forth.

In the annexed drawing, I have shown a stove such as has practically proved operative, and I will describe it to give an idea of the application of my invention; but I do not wish to be understood as confining myself to the construction shown and described, as it may be made different to suit different localities and various kinds of stumps.

A A represent the body of the stove, in two sections, hinged together at B, and lapping by each other on the opposite side, at C, in such a manner that the stove may be contracted or enlarged to fit stumps of different sizes.

It is open at both ends, and may be made in any desired shape. It may be provided with an adjustable cover, D, and door E.

The cover D may be provided with a short pipe, or with a simple opening, F, which may also be provided with a wire screen, to prevent sparks from escaping.

The door E may hang on hinges or slide in projections in any direction, for the purpose of regulating the draught, as in any stove.

The cover D may be raised or removed for the purpose of adding fuel or kindling to the stump to insure its burning.

The stove may also be provided with handles G G on either side of the body, by means of which it may be carried about and placed over or around the stump.

In this stove stumps may be burned with safety near buildings and stacks of grain in the driest season. Dry trees may also be felled by burning in this stove, if it is properly placed around the trunk the same as placed around a stump, except that the cover D must be removed when applied to a tree.

In localities where it is not necessary to take great precaution against the flying about of sparks, for instance, on large tracts of land lately cleared, there is no necessity of providing a cover or fire-door, as a simple cone-shaped cylinder, made either solid or open, in the latter case to hold to the stump by its spring, will effect the desired result, that is to say, create a sufficient draught, which will intensify the fire of the burning stump and insure its burning down, even under the ground for a distance.

What I claim as my invention, and desire to secure by Letters Patent, is—

1. The process of burning out stumps by means of a stove, constructed and adapted to partially or wholly surround and inclose the stump, substantially as set forth.

2. A stove for burning stumps, constructed substantially as described, for the purpose set forth.

HENDERSON WILLARD.

Witnesses:

SAMUEL SMITH,

FREDK. RAYNSFORD.